US010868915B2

(12) United States Patent
Buehler et al.

(10) Patent No.: US 10,868,915 B2
(45) Date of Patent: Dec. 15, 2020

(54) SYSTEM AND METHODS FOR ROUTING COMMUNICATION REQUESTS TO DEDICATED AGENTS

(71) Applicant: Scorch Agency LLC, St. Louis, MO (US)

(72) Inventors: Chris Buehler, Olivette, MO (US); Robert Duebelbeis, St. Louis, MO (US); Brandon M. Brumage, St. Louis, MO (US)

(73) Assignee: CBDA Holdings, LLC, St. Louis, MO (US)

( * ) Notice: Subject to any disclaimer, the term of this patent is extended or adjusted under 35 U.S.C. 154(b) by 0 days.

(21) Appl. No.: 15/808,391

(22) Filed: Nov. 9, 2017

(65) Prior Publication Data

US 2018/0131811 A1 May 10, 2018

Related U.S. Application Data

(60) Provisional application No. 62/419,510, filed on Nov. 9, 2016.

(51) Int. Cl.
| | |
|---|---|
| *H04M 3/523* | (2006.01) |
| *H04M 3/51* | (2006.01) |
| *H04M 3/533* | (2006.01) |

(52) U.S. Cl.
CPC ........ *H04M 3/5233* (2013.01); *H04M 3/5141* (2013.01); *H04M 3/5191* (2013.01);
(Continued)

(58) Field of Classification Search
CPC ......... H04L 12/825; G06F 19/00; G06F 9/46; H04M 3/523; H04M 3/51
(Continued)

(56) References Cited

U.S. PATENT DOCUMENTS 8,995,647 B2 * 3/2015 Li ................ H04M 3/5232
379/265.11
9,313,332 B1 * 4/2016 Kumar ............... H04M 3/5232
(Continued)

FOREIGN PATENT DOCUMENTS

WO WO-2008008993 A2 1/2008

OTHER PUBLICATIONS

Extended European Search Report in corresponding case EP 17870327.8 dated May 8, 2020.

*Primary Examiner* — Ahmad F. Matar
*Assistant Examiner* — Jirapon Intavong
(74) *Attorney, Agent, or Firm* — Harness, Dickey & Pierce, P.L.C.

(57) ABSTRACT

A method is presented for linking a requestor to an agent of an entity. The method includes receiving a request to connect to an agent of an entity from a given requestor, retrieving a pool of agents from a data store, and determining a first subset of agents from the pool of agents, where agents in the first subset of agents have highest rating amongst agents in the pool of agents. The method also includes determining a second subset of agents from the pool of agents, where the agents in the second subset of agents have lowest number of assigned customers amongst the agents in the pool of agents. The method also includes identifying an intersection between the first subset and second subset, and assigning a dedicated agent to the given requestor from the intersection. The method also includes establishing a communication link between the given requestor and the dedicated agent.

9 Claims, 16 Drawing Sheets

(52) U.S. Cl.
CPC .. *H04M 3/53308* (2013.01); *H04M 2203/401* (2013.01); *H04M 2203/408* (2013.01)

(58) Field of Classification Search
USPC .................................................. 379/265.12
See application file for complete search history.

(56) References Cited

U.S. PATENT DOCUMENTS

| | | |
|---|---|---|
| 2007/0074220 A1 | 3/2007 | Edwards et al. |
| 2013/0202100 A1* | 8/2013 | Fagundes .............. H04M 3/523 379/265.1 |
| 2014/0086402 A1 | 3/2014 | Kan et al. |
| 2015/0237213 A1 | 8/2015 | Chishti et al. |
| 2016/0119477 A1 | 4/2016 | Sharpe et al. |
| 2016/0227035 A1 | 8/2016 | Kumar et al. |

* cited by examiner

SYSTEM AND METHODS FOR ROUTING COMMUNICATION REQUESTS TO DEDICATED AGENTS

CROSS-REFERENCE TO RELATED APPLICATIONS

This application claims the benefit of U.S. Provisional Application No. 62/419,510, filed on Nov. 9, 2016. The entire disclosure of the above application is incorporated herein by reference.

FIELD

The present disclosure relates to systems and methods for routing communication requests to dedicated agents.

BACKGROUND

Currently, customers seeking to access information from a company are often required to provide contact information in exchange for access to the information. Companies use the obtained contact information to follow up with the customer at a later time. The need to provide contact information creates a barrier between the customer and the information. Furthermore, each time a customer contacts the company, the customer may be connected to a different agent. The lack of a consistent pairing between a customer and a dedicated agent inhibits the creation of a personal relationship with the customer.

This section provides background information related to the present disclosure which is not necessarily prior art.

SUMMARY

This section provides a general summary of the disclosure, and is not a comprehensive disclosure of its full scope or all of its features.

In one aspect of this disclosure, a computer-implemented method is presented for linking a requestor to an agent of an entity. The method includes: receiving a request to connect to an agent of an entity from a given requestor; and determining whether an agent of the entity was previously assigned to the given requestor. When the requestor was previously assigned an agent, a communication link is established between the given requestor and an assigned agent. When the requestor was not previously assigned an agent, an agent is selected and assigned to given requestor.

In one embodiment, selecting an agent to assign to the given requestor includes retrieving a pool of agents from a data store, where the agents in the pool of agents are associated with the entity and where each agent in the pool of agents has a rating and rating is based on feedback from customers having previous interactions with the agent; determining a first subset of agents from the pool of agents, where agents in the first subset of agents have highest rating amongst agents in the pool of agents; adjusting ratings for each of the agents in the first subset of agents, where ratings are adjusted based on at least one of an amount of time since an agent has interacted with a customer, a number of customers assigned to an agent, an amount and a percentage of missed calls amongst the calls routed to the agent; assigning a dedicated agent to the given requestor, where the dedicated agent has highest rating amongst the agents the first subset of agents; and establishing a communication link between the given requestor to the dedicated agent.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
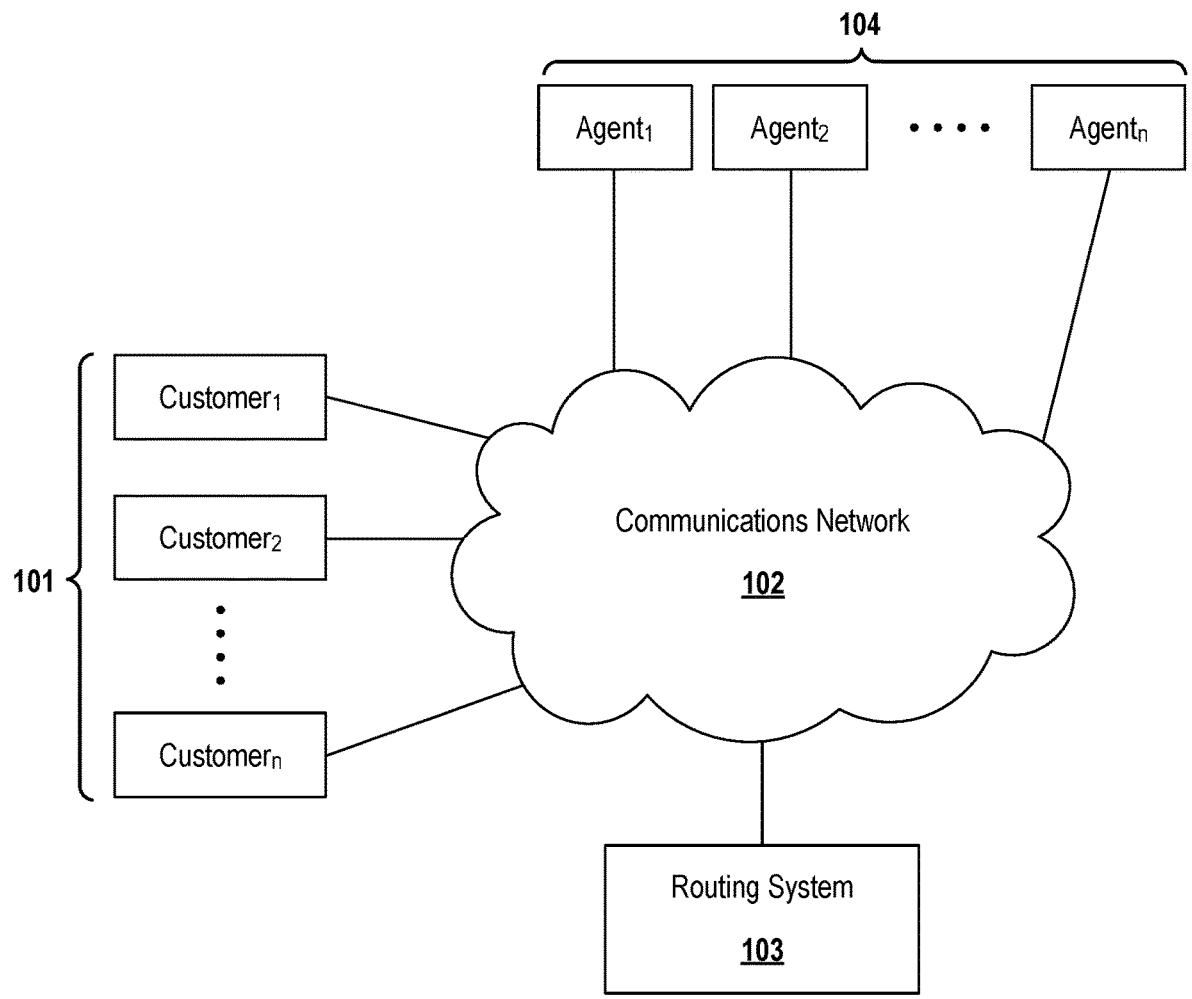
FIGS. 1A-1B are high-level block diagrams of an example system according to the present disclosure.

With reference to FIG. 1A, a high-level block diagram of an example system is shown. The system includes customers 101, a communications network 102, a routing system 103, and agents 104. Although the system illustrates three customers 101 and three agents 104, any number of customers 101 and agents 104 may be incorporated into the system. The customers 101 may be defined as any entity that requests (i.e., a requestor) to connect with an agent using the routing system 103.

The communications network 102 is configured to connect the customers 101, the routing system 103, and the agents 104. The communications network 102 can be implemented by any known communications network, such as a packet switched and/or a circuit switched network.

As an example implementation of the system, a first customer may initiate a phone call or another type of electronic communication (e.g., accessing a uniform resource locator (URL), sending a short messaging service (SMS) message, etc.). Subsequently, the routing system 103 may connect the first customer to an appropriate agent, as described below in further detail. As such, the system provides improves connections between companies and their customers 101 by automatically routing communications requests from customers 101 to the same dedicated agent using, for example, text and voice.

Furthermore, the routing system 103 may be implemented by local computing resources and/or cloud-computing services, such as Amazon Web Services® Amazon Elastic Compute Cloud (EC2), Amazon Web Services® Lambda, Google® Compute Engine, Microsoft® Azure, Rackspace® Cloud Service, or other similar cloud computing environments. Additionally, the routing system 103 may include one or more processors that are configured to execute instructions stored in a non-transitory computer-readable medium, such as a read-only memory (ROM) or a random-access memory (RAM). As a specific example, the routing system 103 may include instructions that enable the one or more processors to handle phone calls and SMS messages.

The routing system 103 may use various data records to implement the methods as presently disclosed. The data records may be stored in the non-transitory computer-readable medium and/or a remote data store, such as a customer record database. Examples of the records include, but are not limited to, routing configuration records, agent records, and customer records, as described below in further detail.

Figure 1B:
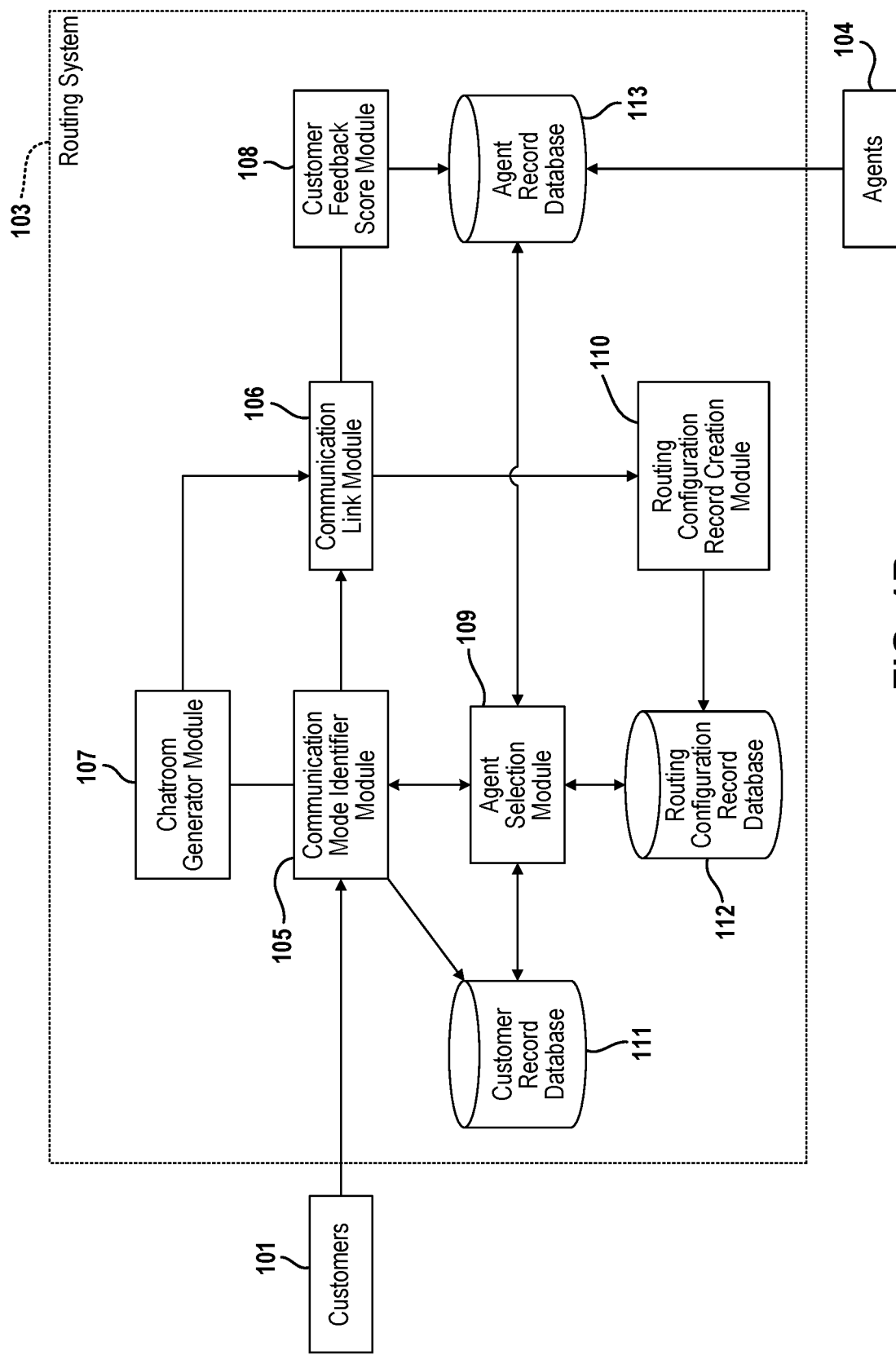

With reference to FIG. 1B, a high-level block diagram of the routing system 103 is shown. The routing system 103 may include a communication mode identifier module 105, a communication link module 106, a chatroom generator module 107, a customer feedback module 108, an agent selection module 109, and a routing configuration record creation module 110, each of which may be implemented by one or more processors that are configured to execute instructions in a non-transitory computer-readable medium, such as a read-only memory (ROM) or a random-access memory (RAM). The routing system 103 may also include a customer record database 111, a routing configuration record database 112, and an agent record database 113.

The communication mode identifier module 105 is configured to receive a request to connect to an agent from a customer and operates to identify the communication medium that the customer is using to connect to the agent. As an example, the communication mode identifier module 105 may be configured to determine that the customer is making a phone call, sending an SMS message, or attempting to initiate an online chat. The request to connect, along with the identified type of communication medium, is passed on to the communication link module 106.

The communication link module 106 in turn operates to establish a connection or communication link between the customer and an agent. For existing customers, the communication link module 106 retrieves a customer record in the customer record database corresponding to the customer. The customer record may include various data elements, such as an ID associated with a customer (e.g., phone number and/or email address), an agent that the customer is assigned to (i.e., the dedicated agent), the customer's name or other identifying information for the customer, the account that the customer belongs to, and a routing configuration record that is associated with the customer record.

An example data structure for the customer record is provided below:
Customer Record
Customer ID:
Dedicated Agent:
Customer's Name:
Account:
Routing Configuration ID:

Additionally, the customer record may include tracking data, which may be defined as information related to the customer's interaction with the routing system 103. As an example, information corresponding to each phone call with the customer may be stored in the customer record. Specifically, the information may include a time the call was initiated, a duration of the call, and if the call was received at or placed by the routing system 103. Additionally or alternatively, the customer record may include elements to store additional information about the customer, such as a date of birth, a title, a company name, etc.

In one example, the customer is placing a phone call to an entity, such as a company. The communication link module 106 handles the incoming phone call on behalf of the entity. If an agent has been previously assigned to the customer and is available, the communication link module 106 attempts to connect the customer to the dedicated agent as identified in the corresponding customer record. An example embodiment for how the communication link module 106 handles incoming phone calls is further described below with reference to FIG. 2.

For new customers or if the dedicated agent is unavailable, the communication link module 106 is interfaced with the agent selection module 109. The agent selection module 109 is configured to assign an agent from a pool of agents to the customer, where the agents in the pool of agents are associated with the company. The agent selection module 109 assigns an agent based on data stored in the customer record database 111 and/or the routing configuration record database 112. As an example, the agent selection module 109 may assign an agent having the highest rating amongst the agents in the pool of agents, where the rating is based on feedback from customers having previous interactions with the agent. An example embodiment for a selection method implemented by the agent selection module is further described below with reference to FIG. 3.

Alternatively, the customer may be trying to contact the entity by sending a text message using Short Message Service (SMS). In a similar manner, the communication link module 106 handles the incoming text message and attempts to connect the customer to an agent of the company. An example embodiment for how the communication link module 106 handles incoming text messages is further described below with reference to FIGS. 4A-4B.

In some instances, the customer may be contacting the company via a web portal. The web portal may present different interfaces for the customer to contact the company, including placing a phone call, sending a text message, or initiating an online chat. Handling the interface selection made by the customer on the web portal is further described in relation to FIG. 5. In the event the customer opts to initiate an online chat, the chatroom generator module 107 handles the setup for the online chat session as described further below in relation to FIG. 8.

Prior to terminating the communication link between the agent and the customer, the customer may be prompted to provide feedback regarding the interactions with the agent. In this regard, the communication link module 106 is interfaced with a customer feedback module 108. The customer feedback module 108 is configured to prompt the customer for feedback. As an example, the customer may be provided with a prompt to provide a customer satisfaction score, for example having a value from 1 to 5, where a value of 1 represents a negative experience and a value of 5 represents a positive experience. The customer feedback module 108 may in turn update a composite feedback score for the agent in the agent record database 113. An example embodiment for how the customer feedback module 108 captures customer feedback and determine a rating for the agent is further described below with reference to FIG. 6 and FIGS. 7A-7B.

Prior to receiving a request to connect to an agent from a customer, the company is required to set up a routing scheme. The routing configuration creation module 110 provides the user interface which enables a company to set up a routing scheme. Based on input from the company, the routing configuration record creation module 110 generates routing configuration records and stores the routing configuration records in the routing configuration record database 112. The routing configuration records store information that is necessary to route incoming communications to the appropriate agent. Each routing configuration record includes elements used to store an identifier and/or name of the routing configuration record (e.g., signal id), a phone number associated with the routing configuration record, a URL associated with the routing configuration record, an account associated with the routing configuration record (e.g., owner), and an indication for a pool of agents associated with the routing configuration record.

An example data structure is provided below:
Routing Configuration Record
Routing Configuration ID:
Phone Number:
URL:
Account:
Agent Pool:

In one embodiment, the agent pool is a unique identifier for a particular pool of agents which serves as a link to secondary data store, where the particular agents associated with the particular pool are stored in the secondary data store. In another embodiment, identifiers for the individual agent associated with the agent pool are stored in the routing configuration record. It is understood by one of ordinary skill in the art that other data elements may be included in the routing configuration record. While reference is made to the entity being a company, it is envisioned that the entity creating the routing scheme may be a non-profit organization, such as a church or a charity, as well as departments internal to the company.

To connect with an agent, each agent has an agent record stored in the agent record database 113. Each agent record includes various data elements, such as a user ID associated with the agent, a phone number of the agent, an email address of the agent, and an agent's current status, (i.e. online or offline).

An example data structure for the agent record is provided below:
Agent Record
Agent ID:
Phone Number:
Email Address:
Current Status:

It is understood by one of ordinary skill in the art that other data elements may be included in the routing configuration record.

Figure 2A:
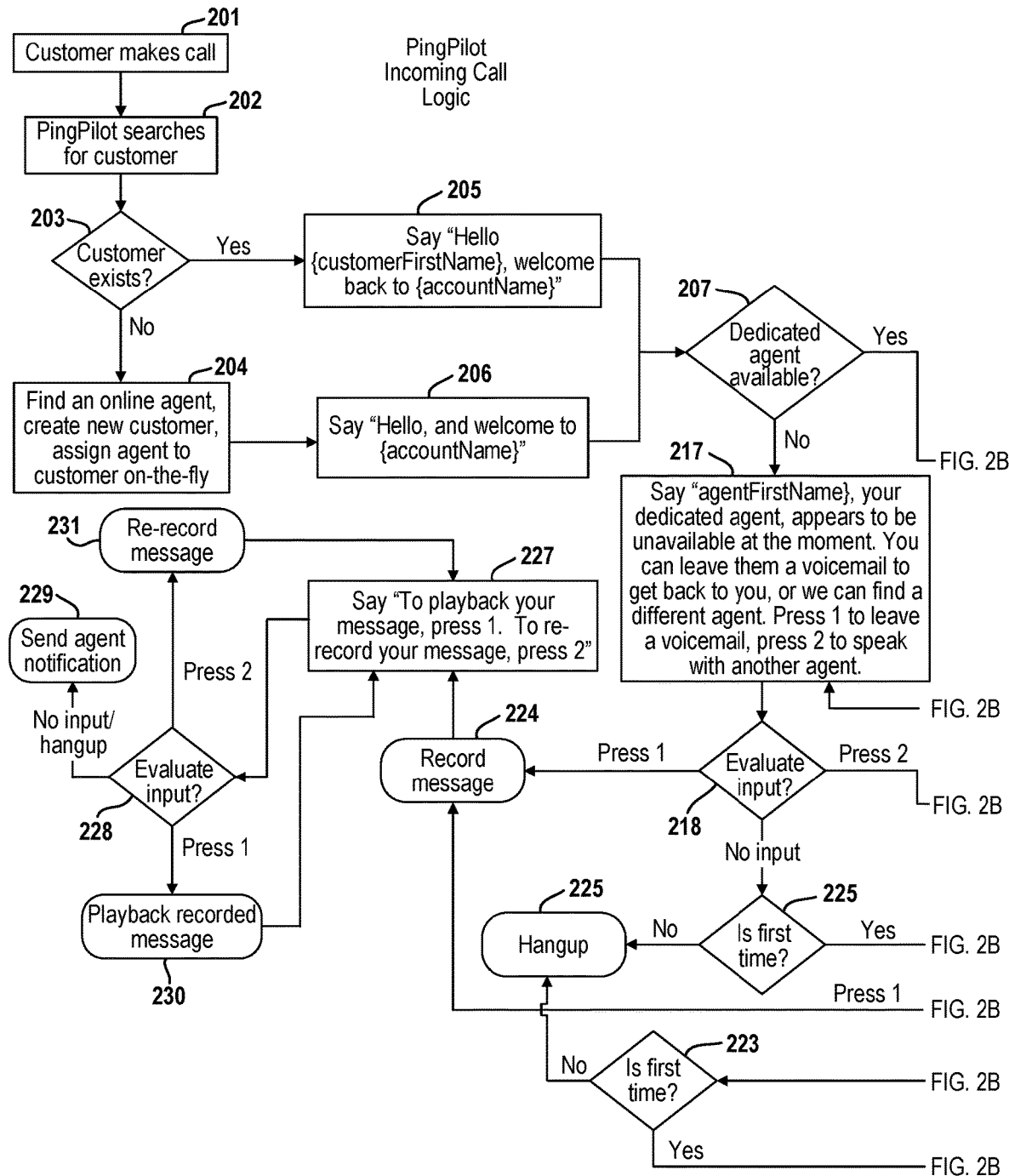
FIGS. 2A-2B are a flowchart describing an example method for routing incoming calls according to the present disclosure.
Figure 2B:
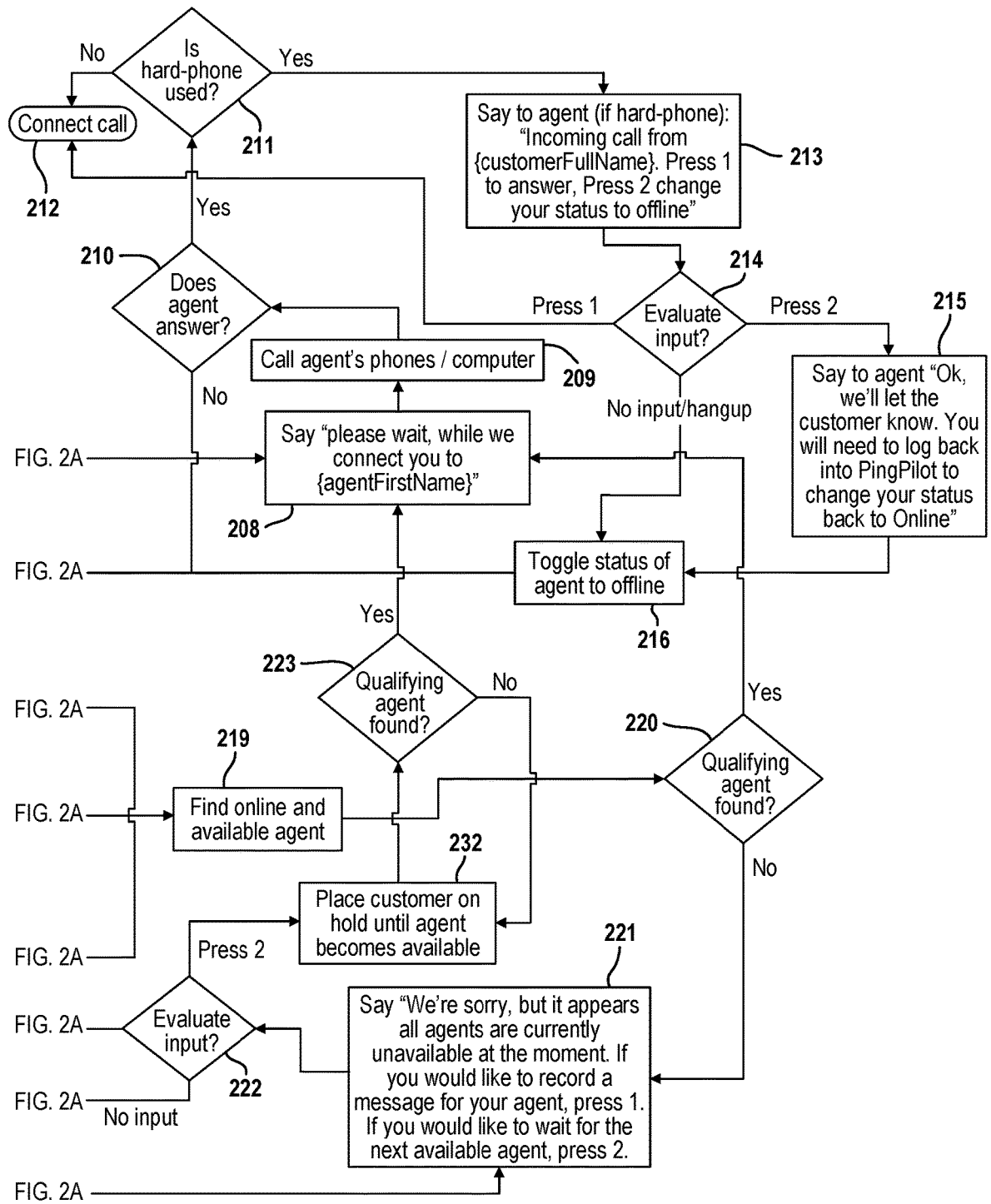

With reference to FIGS. 2A-2B, a flowchart describing an example method for routing incoming calls is shown. Steps 201-207, 218, 223-225, and 227-231 are shown in FIG. 2A, and steps 206-217 and 219-222 are shown in FIG. 2B. This method may be executed by the communication link module 106 in response to receiving a request from the customer to connect to the agent. This method enables a customer to connect to a designated agent with whom the customer has established a previous relationship and/or has developed a rapport with, thereby improving the customer service experience for both customers and agents.

The method begins at 201, where the routing system 103 receives a call from a customer and then proceeds to 202. At 202, the routing system 103 searches for a customer record that is associated with the customer and then proceeds to 203. At 203, the routing system 103 determines if a customer record associated with the customer exists in the customer record database 111. If the customer record is found at 203, the method proceeds to 205; otherwise, if the routing system 103 determines that a customer record does not exist (i.e., the call is from a new customer), the method proceeds to 204. At 205, the routing system 103 retrieves the customer record and uses the stored metadata to generate a greeting associated with the customer and then proceeds to 207. At 204, the routing system 103 creates a new customer record, assigns a dedicated agent to the customer, and stores an identifier of the dedicated agent in the customer record and then proceeds to 206. At 206, the routing system 103 generates a customized greeting for the customer.

At 207, the routing system 103 determines if the dedicated agent assigned to the customer is available. As an example, the routing system 103 determines that an agent is available if the agent's current status is set to "online." If the routing system 103 determines that the dedicated agent is available, the method proceeds to 208; otherwise, if the routing system 103 determines that the dedicated agent is unavailable, the method proceeds to 217. At 208, the routing system 103 generates a customized message, which includes the agent's name, and then attempts to contact the agent at 209. At 217, the routing system 103 generates a recording asking the customer if he or she would like to leave the dedicated agent a voicemail or if they would like to be connected to another agent.

At 210, the routing system 103 determines whether the agent has answered the phone. If the agent has answered the phone, the method proceeds to 211; otherwise, the method proceeds to 217. At 211, the routing system 103 determines if the agent is using a hard-phone (i.e., a phone that is associated with a Voiceover Internet Protocol). If the routing system 103 determines the agent is not using a hard-phone, the method proceeds to 212, where the call is connected to the customer by the routing system 103. If the routing system 103 determines that the agent is using a hard-phone, the method proceeds to 213.

At 213, the routing system 103 generates a message announcing the name of the customer and requesting the agent to either answer the call or change their status to offline. At 214, the routing system 103 evaluates an input from the agent. If the agent chooses to answer the call by, for example, pressing the #1 key on a dial pad of the hard-phone, the method proceeds to 212, where the call is connected to the customer by the routing system 103. If the agent changes his or her status to "offline" by, for example, pressing the #2 key on the dial pad of the hard-phone, the method proceeds to 215. If the agent does not reply or hangs up the hard-phone, then the method proceeds to 216. At 215, the routing system 103 generates an informational message corresponding to the agent's status and then changes the status of the agent to offline at 216. The method then proceeds to 217, where the routing system 103 generates a recording asking the customer if he or she would like to leave the dedicated agent a voicemail or if they would like to be connected to another agent.

At 218, the routing system 103 evaluates an input from the customer. If the customer chooses to leave a voicemail by, for example, pressing the #1 key on the dial pad of the hard-phone, the method proceeds to 224. If the customer chooses to speak with another agent by, for example, pressing the #2 key on the dial pad of the hard-phone, the method proceeds to 219. If the customer does not reply, then the method proceeds to 225.

At 219, the routing system 219 attempts to find an agent that is online and available and then proceeds to 220. Step 219 is described below in further detail with reference to FIG. 3. At 220, the routing system 103 determines whether a qualifying agent was found. If so, the method proceeds to 208; otherwise, the method proceeds to 221, where the routing system 103 generates a message to the customer prompting him or her to leave a message or to wait for the next available agent.

The method then proceeds to 222, where the routing system 103 evaluates an input from the customer. If the customer chooses to leave a voicemail by, for example, pressing the #1 key on the dial pad of the hard-phone, the method proceeds to 224. If the customer chooses to speak with another agent by, for example, pressing the #2 key on the dial pad of the hard-phone, the method proceeds to 232. If the customer does not reply, then the method proceeds to 223.

At 223, the routing system 103 determines if it has prompted the customer to make a selection more than once. If so, the method proceeds to 221; otherwise, the method proceeds to 226 and ends the call. At 232, the routing system 103 places the customer on hold until a qualifying agent is available and then proceeds to 233. At 233, the routing system 103 determines if a qualifying agent is found. If so, the method proceeds to 208; otherwise, the method proceeds to 232.

At 224, the routing system 103 records a voicemail from the customer and then proceeds to 227. At 225, the routing system 103 determines if it has prompted the customer to make a selection more than once. If so, the method proceeds to 226, where the routing system ends the call; otherwise, the method proceeds to 217.

At 227, the routing system 103 instructs the customer to generate an input corresponding to a desired action associated with the voicemail, and the routing system evaluates the input at 228. If the customer chooses to replay the voicemail by, for example, pressing the #1 key on the dial pad of the hard-phone, the method proceeds to 230. If the customer chooses to re-record the message by, for example, pressing the #2 key on the dial pad of the hard-phone, the method proceeds to 231. If the customer does not reply, then the method proceeds to 229.

At 229, the routing system 103 transmits a notification to the agent corresponding to the voicemail provided by the customer. At 230, the routing system 103 replays the recorded message and then proceeds to 227. At 231, the customer re-records the message and then proceeds to 227.

Figure 3:
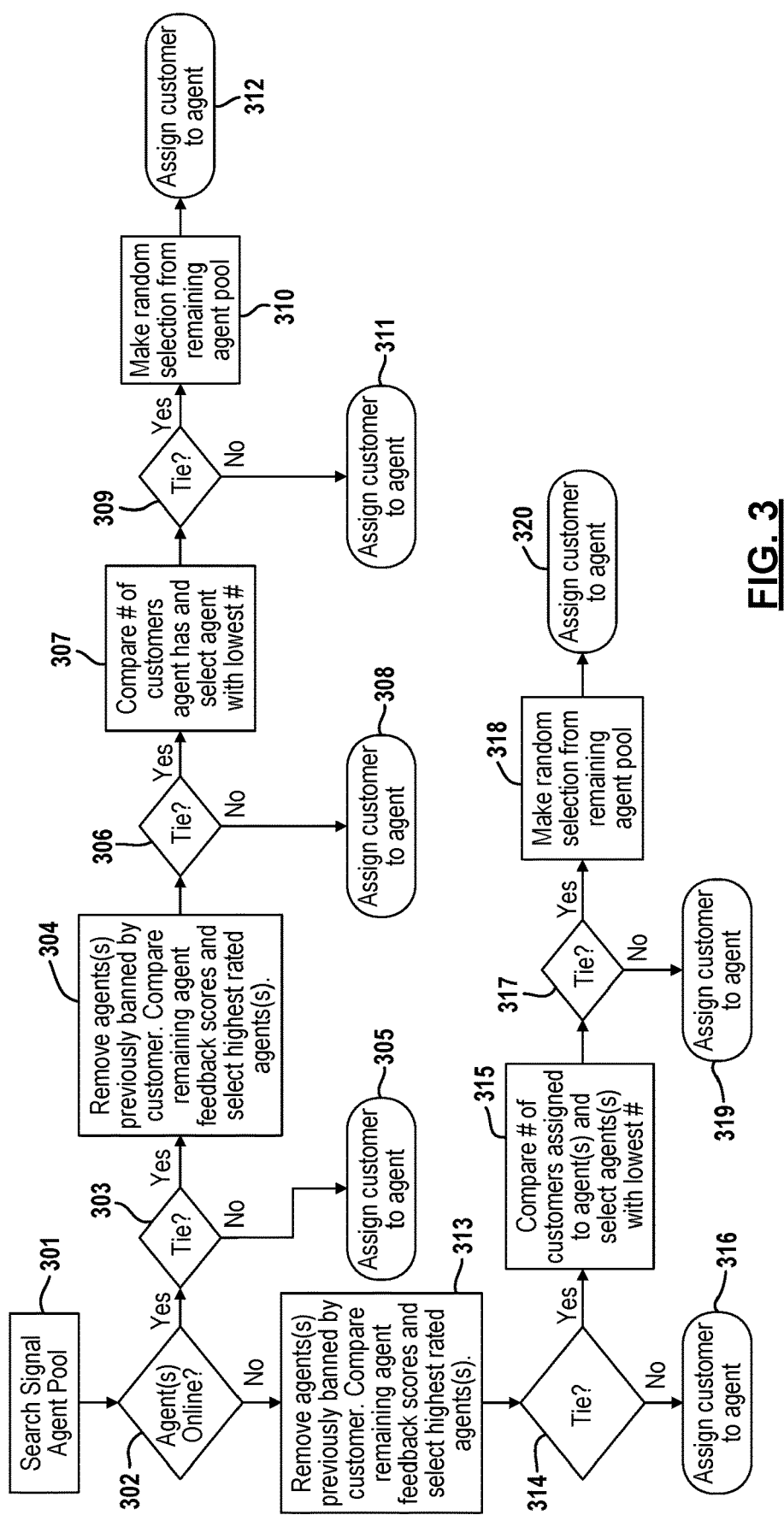
FIG. 3 is a flowchart describing an example method for assigning customers to an agent according to the present disclosure.

With reference to FIG. 3, a flowchart describing an example method for assigning customers to an agent is shown. As described above with reference to FIG. 2, FIG. 3 is a detailed illustration corresponding to step 219. This method may be implemented by the agent selection module 109, and the method is implemented in response to the dedicated agent of the customer record not being available. Furthermore, this method enables a customer to connect to an agent with whom the customer has established a previous relationship with and/or has a high rating, thereby improving the customer service experience for both customers and agents.

The routing system 103 at 301 begins a search for agents by searching only for agents included in the pool of agents associated with a routing configuration record. At 302, the routing system 103 determines if at least one of the agents within the associated pool of agents are online. If the routing system 103 determines that an agent is online, the method proceeds to 303; otherwise, the method proceeds to 312. At 303, the routing system 103 determines whether more than one agent is online (i.e., is there a tie with respect to an "online" status?). If so, the method proceeds to 304; otherwise, the method proceeds to 305. At 305, in response to determining that only one agent in the pool of agents is online, the routing system 103 assigns the identified agent to the customer.

At 304, in response to determining that two or more agents in the pool of agents are online, the routing system 103 removes agents previously banned by the customer from the pool of agents, and the routing system determines which agent has the highest customer feedback score among the remaining agents of the pool of agents. As an example, the routing system 103 may use customer feedback scores to create a list of banned agents. Generating customer feedback scores and assigning agents to a customer's banned agent list is described below in further detail with reference to FIGS. 6-7. Moreover, agents on a customer's banned list are agents that the customer has indicated that they are not to be matched with.

At 306, the routing system determines whether more than one agent has the highest customer feedback score (i.e., is there a tie with respect to the highest customer feedback score?). If so, the method proceeds to 307; otherwise, the method proceeds to 308. At 308, in response to determining that only one agent of the remaining agents in the pool of agents has the highest customer feedback score, the routing system 103 assigns the identified agent to the customer.

At 307, the routing system 103 determines the number of customers matched with each agent of the remaining agents in the pool of agents and selects the one or more agents with the lowest number of assigned customers. At 309, the routing system determines whether more than one agent has the lowest number of assigned customers (i.e., is there a tie with respect to the lowest number of assigned customers?). If so, the method proceeds to 310; otherwise, the method proceeds to 311. At 311, in response to determining that only one agent of the remaining agents in the pool of agents has the lowest number of assigned customers, the routing system 103 assigns the identified agent to the customer. At 310, in response to determining that two or more agents of the remaining agents in the pool of agents have the lowest number of assigned customers, the routing system 103 randomly selects one of the two or more identified agents and then assigns the randomly selected agent to the customer at 312.

At 313, in response to determining no agents in the pool of agents are online, the routing system 103 removes agents previously banned by the customer from the pool of offline agents, and the routing system determines which agent has the highest customer feedback score among the remaining agents of the pool of offline agents. At 314, the routing system determines whether more than one agent of the pool of offline agents have the highest customer feedback score (i.e., is there a tie with respect to the highest customer feedback score?). If so, the method proceeds to 315; otherwise, the method proceeds to 316. At 316, in response to determining that only one agent of the remaining agents of the pool of offline agents has the highest customer feedback score, the routing system 103 assigns the identified agent to the customer.

At 315, the routing system 103 determines the number of customers matched with each agent of the remaining agents in the pool of offline agents and selects the one or more agents with the lowest number of assigned customers. At 317, the routing system determines whether more than one agent has the lowest number of assigned customers (i.e., is there a tie with respect to the lowest number of assigned customers?). If so, the method proceeds to 318; otherwise, the method proceeds to 319. At 319, in response to determining that only one agent of the remaining agents in the pool of offline agents has the lowest number of assigned customers, the routing system 103 assigns the identified agent to the customer.

At 318, in response to determining that two or more agents of the remaining agents in the pool of agents have the lowest number of assigned customers, the routing system 103 randomly selects one of the two or more identified agents and then assigns the randomly selected agent to the customer at 320.

In a simple embodiment, the customer feedback score (i.e., rating) for a given agent is an average of feedback scores provided by customers during previous interactions with the agent and stored as a composite feedback score on the agent record database.

In another embodiment, the rating for each agent may be adjusted based on different factors. For example, the rating may be adjusted based on at least one of an amount of time since an agent has interacted with a customer, a number of customers assigned to an agent, an amount or a percentage of missed calls amongst the calls routed to the agent. Adjusting the agent rating using the amount of time since the agent has interacted with a customer provides load balancing amongst the agents in the applicable pool of agents. By way of example, an agent's feedback score may be adjusted by an fixed amount as follows:

| Time since interaction | Adjustment |
| --- | --- |
| more than 20 min | 0.50 |
| 10-20 min | 0.25 |
| less than 10 min | 0.15 |

Depending on the amount of time since an agent has interacted with a customer, an adjustment amount is added to the feedback score. In this way, the adjustment to the rating is proportional to the amount of time since the given agent interacted with a customer. It is also envisioned that the adjustment amount may be determined as a mathematical function of the amount of the time since the agent has interacted, where the mathematical function related to these two variables is derived empirically.

Adjusting the agent rating using number of customers assigned to an agent is another technique for providing load balancing amongst the agents in the applicable pool of agents. As an example, the agent's feedback score may be adjusted by a fixed amount as follows:

| Number of customers | Adjustment |
| --- | --- |
| more than 75 | 0.20 |
| 50-75 | 0.30 |
| 25-50 | 0.40 |
| less than 25 | 0.50 |

Depending on the number of customers assigned to an agent, an adjustment amount is added to the feedback score for that agent. In this case, the adjustment to the rating is inversely proportional to the number of customers assigned to the agent. Likewise, it is also envisioned that the adjustment amount may be determined as a mathematical function of the amount of the time since the agent has interacted, where the mathematical function related to these two variables is derived empirically.

Adjusting the agent rating based on the number (or percent) of missed calls routed to an agent ensures that calls or incoming connection requests are handled by the more responsive agents. Consequently, the adjustment to the rating is also inversely proportional to the number or percent of missed calls routed to an agent amongst the agents in the applicable pool of agents and can be computed in a similar manner as adjustments made for number of customers assigned to the agent. Adjustments to the agent rating may be based on one of these three factors or combinations thereof. It is understood that these adjustment techniques are merely illustrative and other techniques are contemplated by this disclosure. Rather than adjusting the customer feedback score as described above, the agent rating may be determined by a quadratic equation, where each variable corresponds to a different factor and the coefficients are weights applied to each of the variables.

Figure 4A:
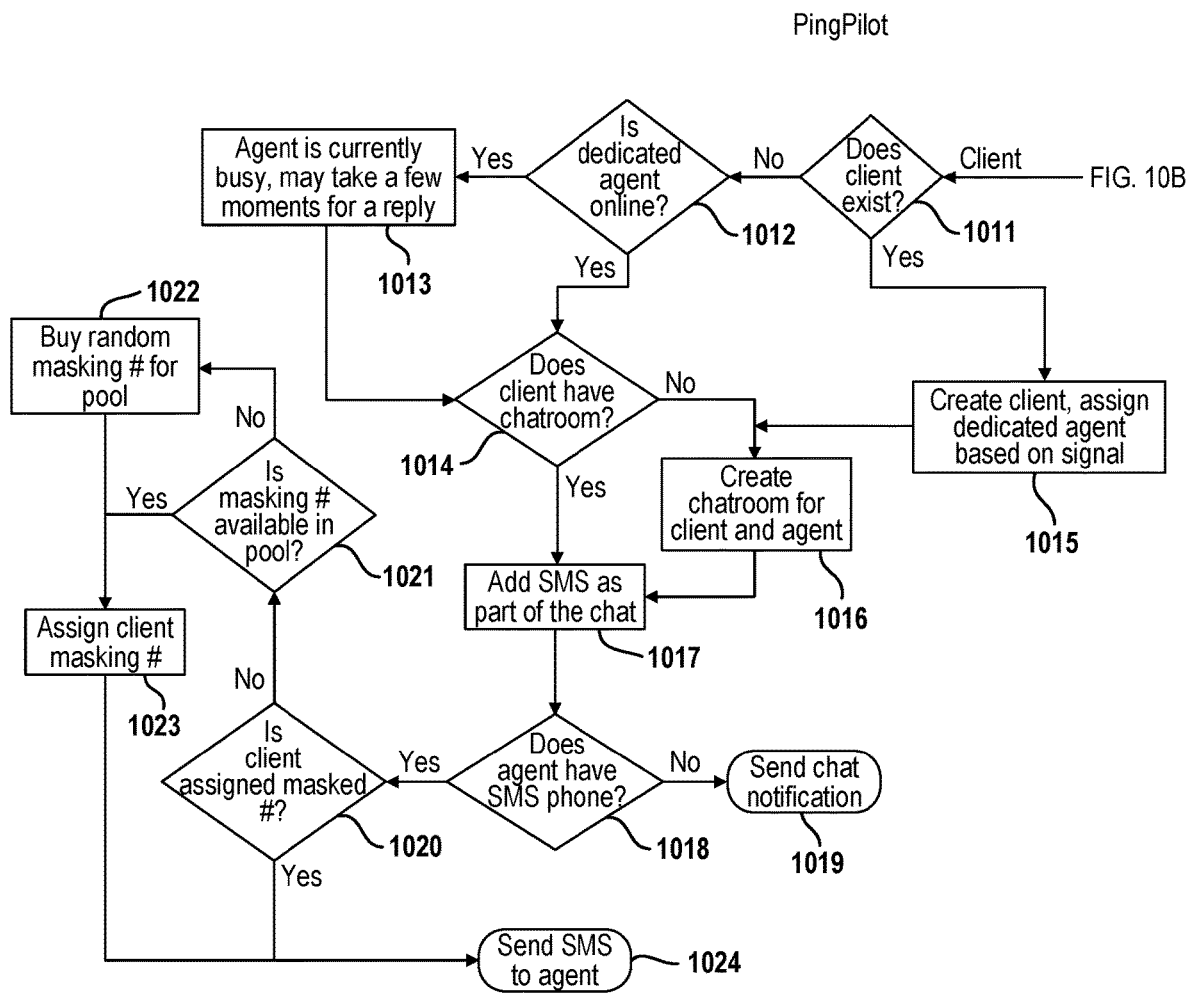
FIGS. 4A-4B are a flowchart illustrating an example method for routing incoming SMS communications according to the present disclosure.
Figure 4B:
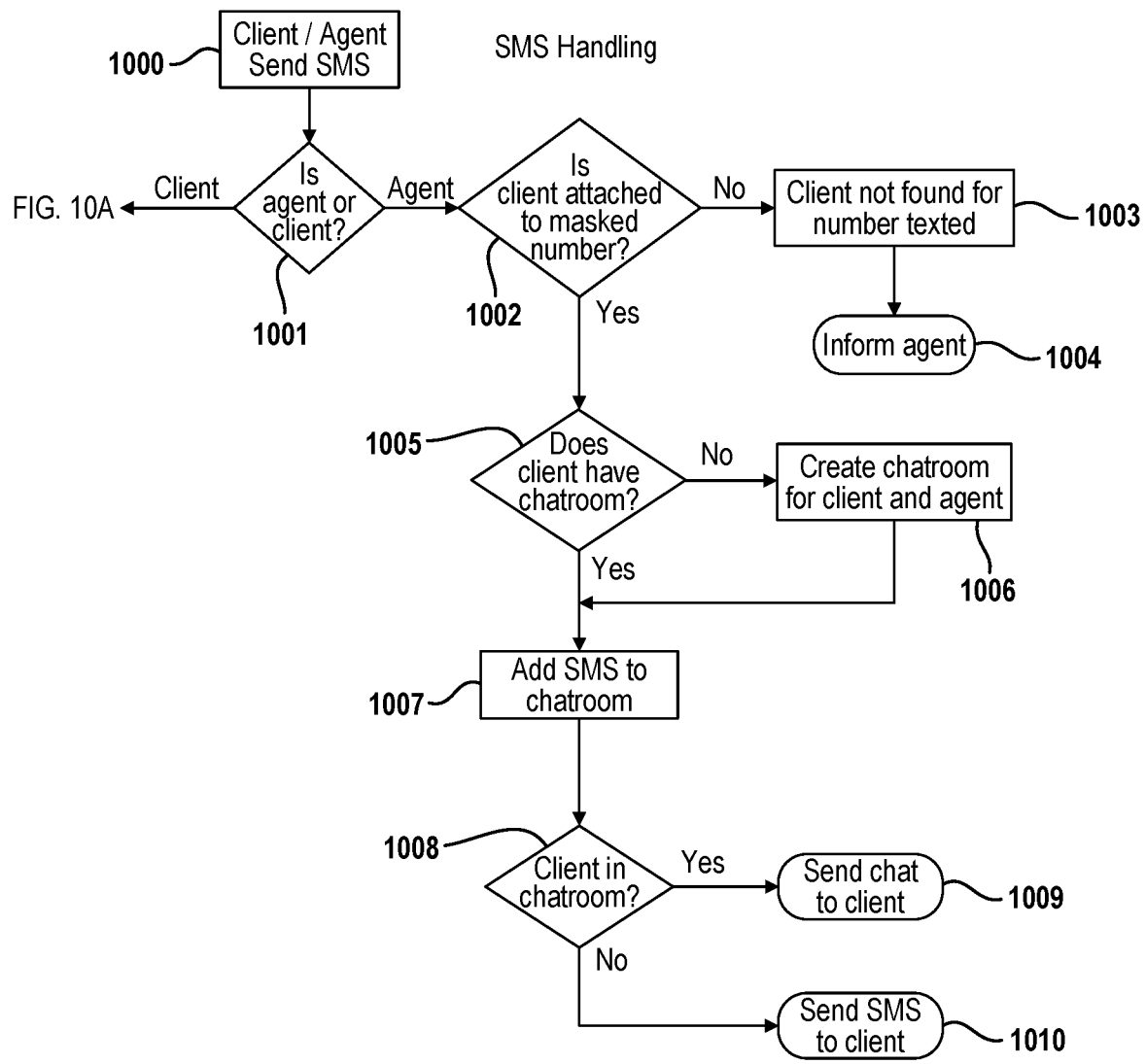

With reference to FIGS. 4A-4B, a flowchart of an example method for routing incoming SMS communications is shown. Steps 1011-1024 are shown in FIG. 4A, and steps 1000-1010 are shown in FIG. 4B. This method may be executed by the communication link module 106 in response to receiving a request from the customer to connect to an agent.

The method begins at 1000, where the customer or the agent sends an SMS message to another party. At 1001, the routing system 103 determines whether the SMS message was transmitted by the customer or the agent. If the SMS message was transmitted by the agent, the method proceeds to 1002; otherwise, if the message was transmitted by the customer, the method proceeds to 1011. At 1002, the routing system 103 determines whether the customer, who is the intended recipient of the SMS message transmitted by the agent, is attached to a masked number (i.e., anonymous number). If so, the method proceeds to 1005; otherwise the method proceeds to 1003. At 1003, the routing system 103 determines that a customer associated with the phone number was not found and then informs the agent of this determination at 1004. At 1005, the routing system 103 determines whether the customer has an active chatroom module. If so, the method proceeds to 1007; otherwise, the method proceeds to 1006, where the routing system creates a chatroom module to connect the customer and the agent and then proceeds to 1007.

At 1007, the routing system 103 adds SMS messaging capabilities to the chatroom module. At 1008, the routing system 103 determines whether the customer is connected to the chatroom module. If so, the method proceeds to 1009, where the routing system 103 transmits a chat via the chatroom module; otherwise, the method proceeds to 1010, where the routing system 103 sends the SMS message to the customer.

At 1011, in response to the routing system determining the message was transmitted by the customer, the routing system determines whether a customer record associated with the customer exists in a data store, such as the customer record database. If the customer record is found at 1011, the method proceeds to 1012; otherwise, if the routing system 103 determines that a customer record does not exist (i.e., the SMS message is from a new customer), the method proceeds to 1015. At 1015, the routing system 103 creates a new customer record, assigns a dedicated agent to the customer, and stores an identifier of the dedicated agent in the customer record and then proceeds to 1016.

At 1012, the method routing system 103 determines whether the dedicated agent assigned to the customer is available As an example, the routing system 103 determines that an agent is available if the agent's current status is set to "online." If the routing system 103 determines that the dedicated agent is available, the method proceeds to 1014; otherwise, if the routing system 103 determines that the dedicated agent is unavailable, the method proceeds to 1013. At 1013, the routing system 103 may generate and transmit an SMS message to the customer stating that the agent is currently busy and will reply at a later time, and then proceeds to 1014.

At 1014, the routing system 103 determines whether the customer has an active chatroom module. If so, the method proceeds to 1017; otherwise, the method proceeds to 1017, where the routing system 103 creates a chatroom module to connect the customer and the agent and then proceeds to 1017. At 1017, the routing system 103 adds SMS messaging capabilities to the chatroom module. At 1018, the routing system 103 determines whether the dedicated agent has a phone that is capable of transmitting SMS messages. If so, the method proceeds to 1020; otherwise, the method proceeds to 1019, where the routing system 103 sends a chat notification to the chatroom module located within the user interface of the dedicated agent.

At 1020, the routing system 103 determines whether the agent, who is the intended recipient of the SMS message transmitted by the customer, is attached to a masked number (i.e., anonymous number). If so, the method proceeds to 1024; otherwise the method proceeds to 1021. At 1021, the routing system 103 determines whether masking is available. If so, the method proceeds to 1023; otherwise, the method proceeds to 1022. At 1022, the customer purchases a random masking number associated and then proceeds to 1023. At 1023, the routing system 103 assigns the masking number to the customer and proceeds to 1024. At 1024, the routing system 103 transmits the SMS message to the agent.

Figure 5:
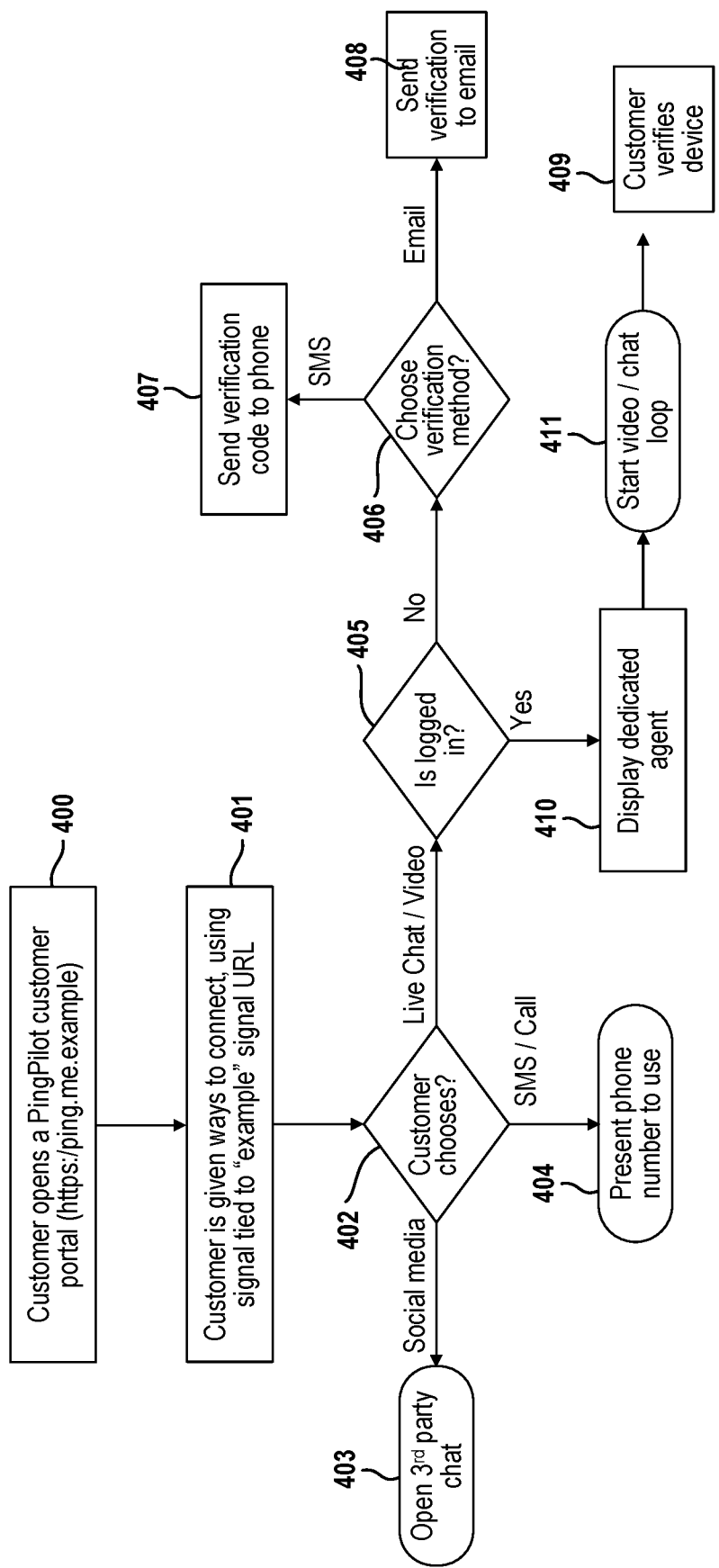
FIG. 5 is a flowchart describing an example method for initiating communications between a customer and an agent in response to receiving a URL request according to the present disclosure.

With reference to FIG. 5, a flowchart for initiating communications between a customer and an agent in response to the communication mode identifier module 105 receiving a URL request is shown. This method may be executed by the communication link module 106 in response to the communication mode identifier module 105 receiving a URL request.

The method begins at 400, where the routing system 103 detects that a customer has accessed a URL associated with a routing configuration record and then proceeds to 401. At 401, the routing system 103 prompts the customer to select a communication type, and then the routing system 103 evaluates the selection at 402. In response to selecting a social media type communication, the method proceeds to 403. In response to selecting a phone/SMS type communication, the method proceeds to 404. In response to selecting a live chat/video chat type communication, the method proceeds to 405. At 403, the routing system 103 initiates a third-party chat via a social media application (e.g., Facebook, Twitter, etc.). The routing system 103 may initiate the third-party chat using a web browser or a native application installed on the customer's computing device. At 404, the routing system 103 provides the customer a phone number associated with the designated agent, thereby enabling the customer to call and/or send an SMS message to the designated agent. At 405, the routing system 103 determines whether the customer is logged in. If so, the method proceeds to 410. Otherwise, the method proceeds to 406. At 410, the routing system 103 displays the dedicated agent and initiates the live chat/video chat at 411.

At 406, the routing system 103 prompts the customer to select a security verification method, thereby providing the customer the ability to verify his or her identity. If the customer selects an SMS method, the method proceeds to 407; otherwise, if the customer selects an email verification method, the method proceeds to 408. At 407, the routing system 103 sends a verification code via an SMS message to the customer's phone in order to verify the customer's identity. Furthermore, the customer may be prompted to transmit the verification code to the routing system 103 to verify his or her identity. The method then proceeds to 409.

At 408, the routing system 103 sends a verification code via an email message to the customer in order to verify the customer's identity. Furthermore, the customer may be prompted to transmit the verification code to the routing system 103 to verify his or her identity. The method then proceeds to 409. At 409, the customer verifies the device by inserting the security code and then proceeds to 411.

Figure 6:
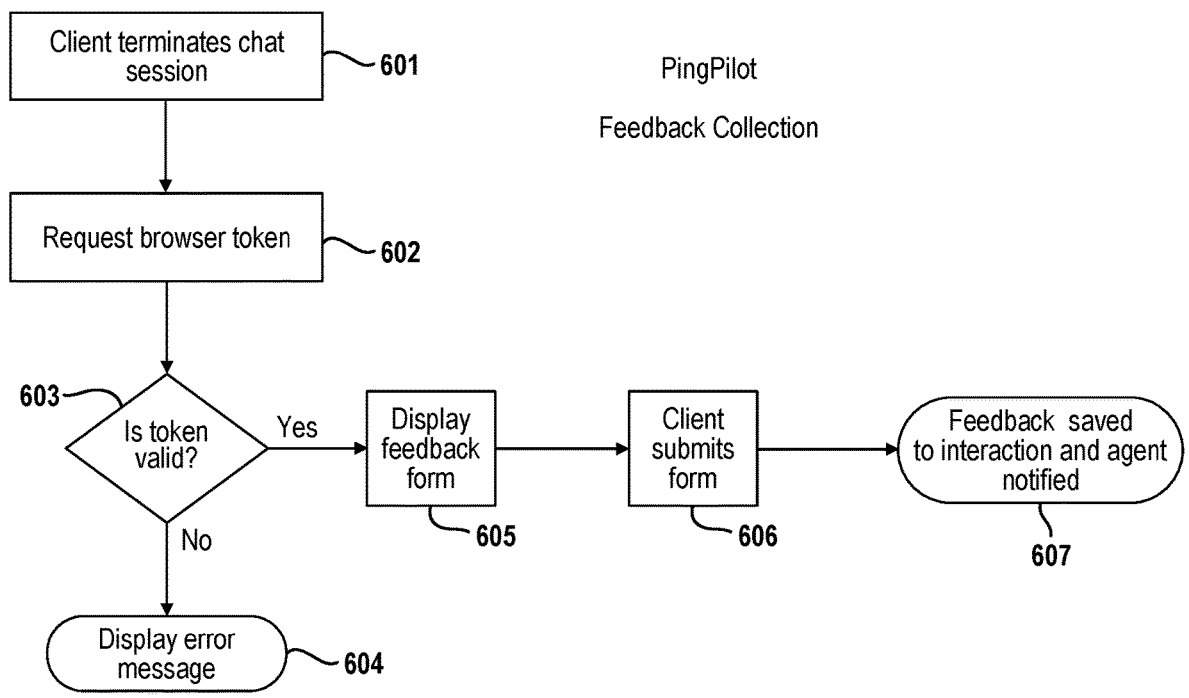
FIG. 6 is a flowchart describing an example method for generating customer feedback scores for chatroom sessions according to the present disclosure.

With reference to FIG. 6, a flowchart describing an example method for generating a customer feedback score for a chatroom session is shown. The method may be implemented by the customer feedback module 108 and in response to the interaction being terminated by either the customer or the agent.

The method begins at 601 when the customer terminates a chatroom session. At 602, the router system 103 requests a browser token and then proceeds to 603. At 603, the router system 103 determines whether the requested token is valid. If so, the method proceeds to 605; otherwise, the method proceeds to 604, where the routing system 103 generates and displays an error message corresponding to the invalid token.

At 605, the routing system 103 generates and displays a feedback form. The feedback form enables the customer to input values associated with various parameters in order to generate the customer feedback score. As an example, the customer may be provided with a prompt to insert a value from 1 to 5 that is representative of the customer's satisfaction with the interaction between the agent, wherein a value of 1 represents a negative experience, and a value of 5 represents a positive experience. Moreover, the routing system 103 may acquire a plurality of customer feedback scores for each agent in order to determine an average customer feedback score for the agent. As another example, in addition to calculating the average customer feedback score for the agents 104, the routing system 103 may be configured to assign each of the agents 104 to a tier and/or category based on the average customer feedback score.

At 606, the customer inserts values into the feedback form corresponding to the customer's satisfaction with the agent. At 607, the routing system 103 saves the feedback form and provides the feedback form to the agent. Additionally, the routing system 103 may be configured to update the average customer feedback score of the corresponding agent once the routing system 103 saves the feedback form.

Figure 7A:
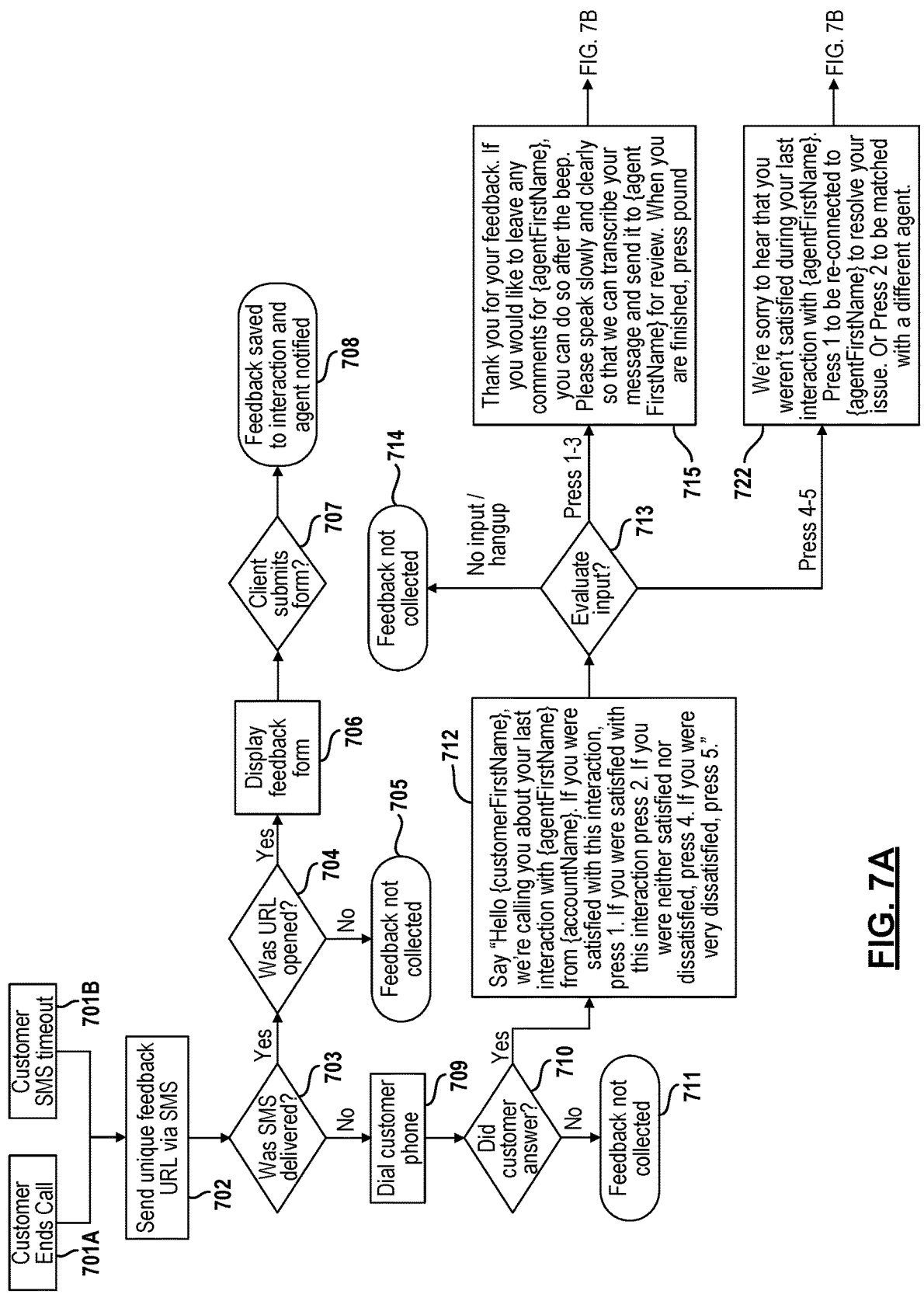
FIGS. 7A-7B are a flowchart describing an example method for generating customer feedback scores for phone calls and/or short messaging service (SMS) messages according to the present disclosure.
Figure 7B:
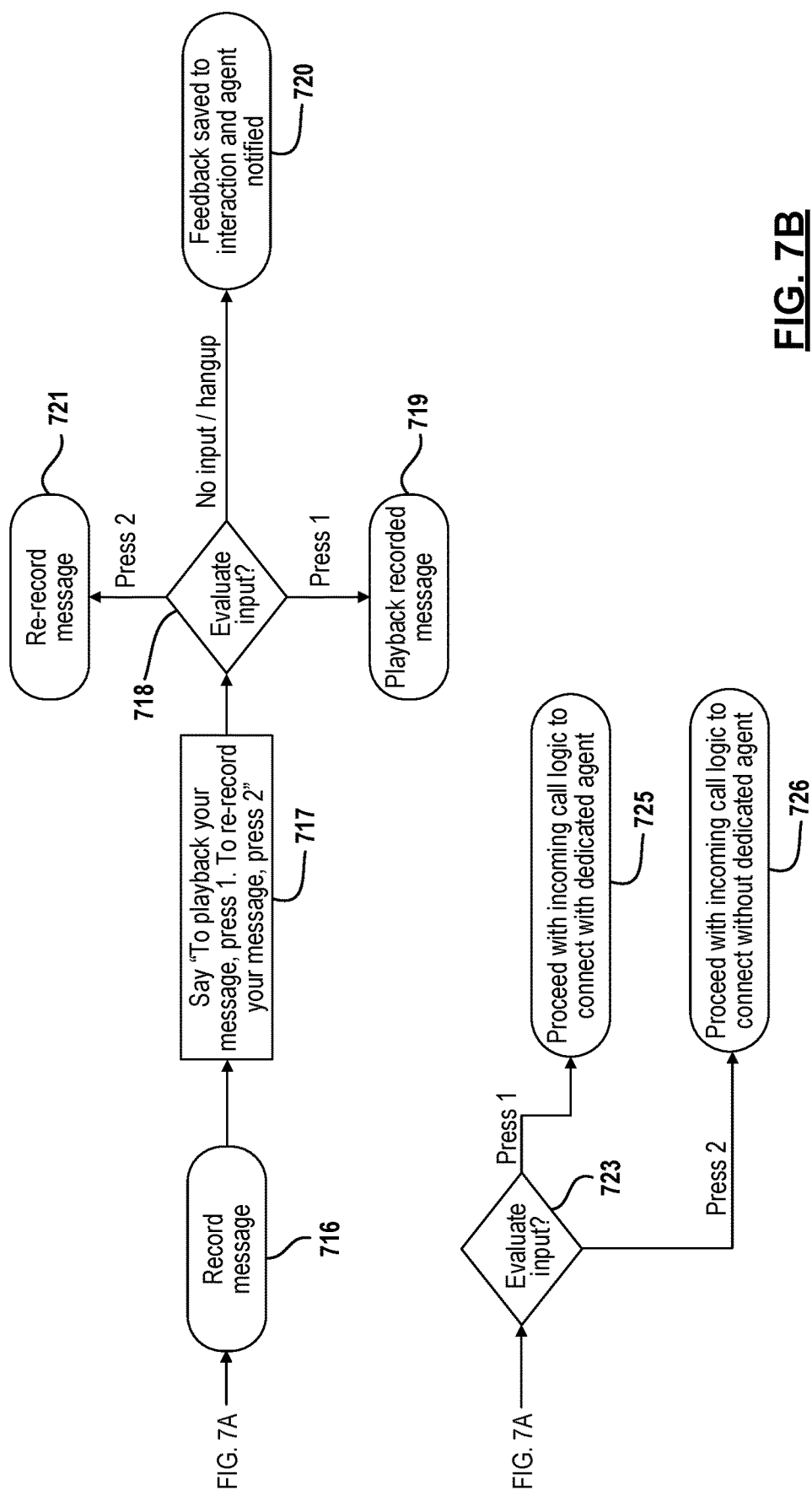

With reference to FIGS. 7A-7B, a flowchart describing an example method for generating a customer feedback score for a phone call and/or SMS message are shown. Steps 701-715 and 722 are shown in FIG. 7A, and steps 716-721 and 723-726 are shown in FIG. 7B. At 701A, the customer ends the phone call and proceeds to 702. Likewise, at 702A, an SMS timeout occurs, and the method then proceeds to 702. At 702, the customer sends a unique feedback URL via an SMS message. At 703, the method determines whether the SMS message was delivered. If so, the method proceeds to 704. Otherwise, the method proceeds to 709.

At 704, the method determines whether the URL was opened. If so, the method proceeds to 706; otherwise, the method proceeds to 705, where the method determines that the routing system 103 did not obtain feedback from the customer. At 706, the routing system 103 generates and displays the feedback form. At 707, the customer inputs values into the parameters of the feedback form and submits it to the routing system 103, as described above with reference to FIG. 6. At 708, the routing system 103 saves the feedback form and provides the feedback form to the agent. Additionally, the routing system 103 may be configured to update the average customer feedback score of the corresponding agent once the routing system 103 saves the feedback form.

At 709, in response to the SMS message not being delivered, the designated agent calls the customer's phone associated with the customer's record. At 710, the method determines whether the customer has answered the phone. If the customer does not answer the phone, the method proceeds to 711, where the method determines that the routing system 103 did not obtain feedback from the customer. Otherwise, the method proceeds to 712, where the routing system 103 generates a customized message for the customer with instructions to provide an input corresponding to the customer's experience with the agent.

At 713, the routing system 103 evaluates an input from the customer. If the customer indicates that he or she had a positive experience by, for example, pressing the #1, #2, or #3 key on a dial pad of the phone, the method proceeds to 715. If the customer indicates that he or she did not have a positive experience by, for example, pressing the #4 or #5 key on the dial pad of the phone, the method proceeds to 722. If the customer does not reply or hangs up the phone, the method proceeds to 714, where the method determines that the routing system 103 did not obtain feedback from the customer.

At 715, the routing system 103 generates and transmits a message to the customers with instructions for leaving a voicemail. At 716, the routing system 103 records the message provided by the customer. At 717, the routing system 103 instructs the customer to generate an input corresponding to a desired action associated with the voicemail, and the routing system evaluates the input at 718. If the customer chooses to replay the voicemail by, for example, pressing the #1 key on the dial pad of the phone, the method proceeds to 719. If the customer chooses to re-record the message by, for example, pressing the #2 key on the dial pad of the phone, the method proceeds to 721. If the customer does not reply, then the method proceeds to 720. At 720, the routing system 103 transmits a notification to the agent corresponding to the voicemail provided by the customer. At 721, the routing system 103 replays the recorded message and then proceeds to 717. At 719, the customer re-records the message and then proceeds to 717.

At 722, the routing system 103 generates and transmits a message to the customers with instructions to resolve the issue associated with the negative experience or to speak to a different agent, and the method evaluates the customer's input at 723. If the customer chooses to resolve the issue with the dedicated agent by, for example, pressing the #1 key on the dial pad of the phone, the method proceeds to 725. If the customer chooses to speak to a different agent by, for example, pressing the #2 key on the dial pad of the phone, the method proceeds to 726. At 725, the routing system 103 connects the customer to the dedicated agent. At 726, the routing system 103 connects the customer to another agent rather than the dedicated agent.

Figure 8:
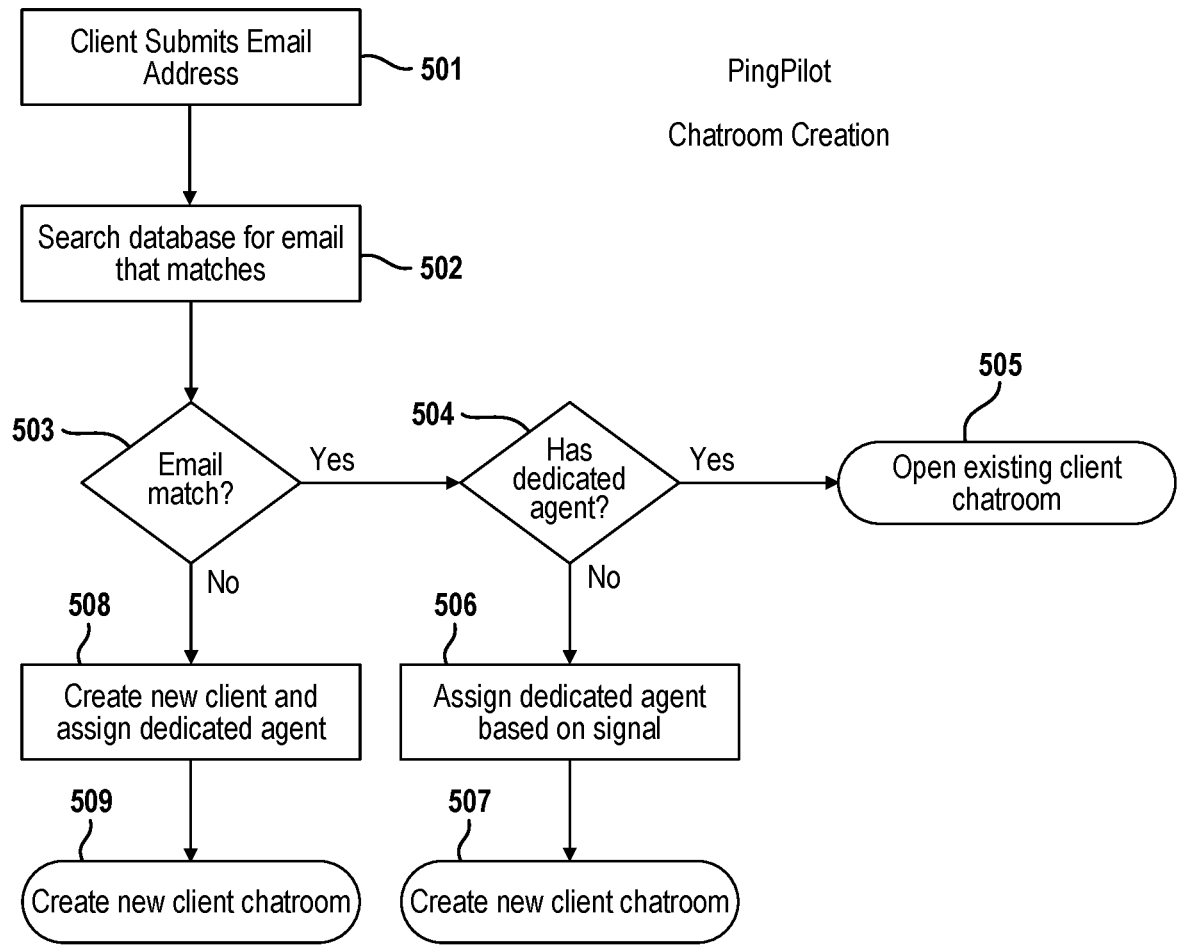
FIG. 8 is a flowchart describing an example method for the creation of a chatroom according to the present disclosure.

With reference to FIG. 8, a flowchart describing an example method for the creation of a chatroom session is shown. As described above with reference to FIG. 5, FIG. 8 is a detailed illustration corresponding to step 409. The method may be implemented by the chatroom generator module 107 in response to the communication mode identifier module 105 determining that the customer is attempting to initiate a chat with the agent.

The method begins at 501, when the customer submits an email address to the routing system 103. At 502, the routing system 103 searches the customer records for a customer record that includes an email that matches the email inputted by the customer at step 501. At 503, the routing system 103 determines whether any of the customer records include an email address that matches the email address inputted by the customer. If so, the method proceeds to 504; otherwise, the method proceeds to 508. At 504, the routing system 103 determines whether the identified customer record includes a dedicated agent. If so, the method proceeds to 505 and initiates a chatroom module with the dedicated agent; otherwise, the method proceeds to 506. At 506, the routing system 103 assigns a dedicated agent based on the associated routing configuration record and then proceeds to 507. At 507, the routing system 103 initiates a chatroom module with the assigned dedicated agent.

At 508, the routing system 508 creates a new customer record, assigns a dedicated agent based on the associated routing configuration record, and stores an identifier of the dedicated agent in the customer record, and then proceeds to 509. At 509, the routing system 103 initiates a chatroom module with the dedicated agent.

Figure 9:
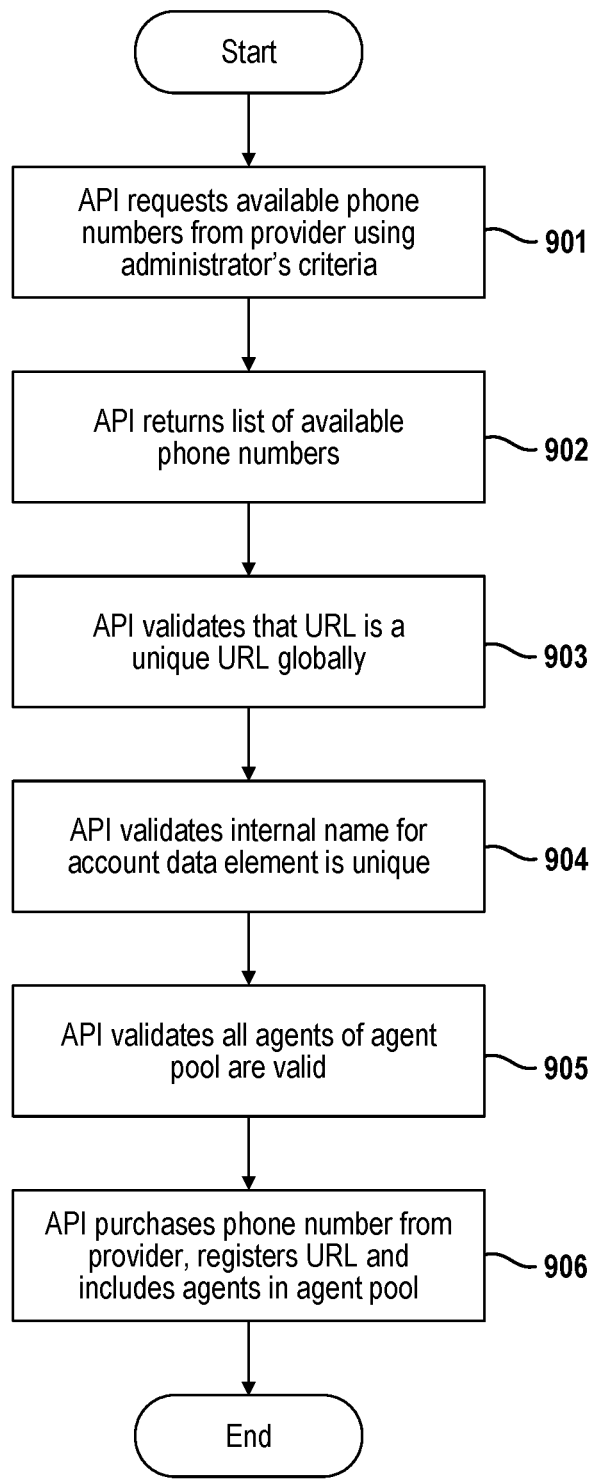
FIG. 9 is a flowchart of an example method for the creation of a routing configuration record according to the present disclosure.

With reference to FIG. 9, an example method illustrating the creation of a routing configuration record is shown. This method may be executed by the routing configuration record creation module 110 in order to, as described above, set up a company's routing scheme. As described above, the routing configuration record includes a routing configuration name, a phone number, a URL, an account type, and an agent pool. Accordingly, this method specifically describes how each of these data elements is assigned to a company's routing configuration record.

The method begins at 901 when an API of the routing system 103 requests a list of available phone numbers from a provider using the administrator's criteria (e.g., a toll-free phone number, a local phone number, etc.). Subsequently, at 902, the API of the routing system 103 returns a list of available phone numbers. An example user interface describing the generation of the list of available phone numbers is described below with reference to FIG. 10A. At 903, the API validates that the URL indicated by the administrator is a globally unique URL. An example user interface describing the generation and validation of the URL is described below with reference to FIG. 10B.

At 904, the API validates that the internal name for the account data element is unique. As an example, the API may simply verify that the internal name for the account data element is unique with respect to each routing configuration record in the routing configuration record database 112. At 905, the API validates all agents of agent pool are valid. As an example, the API of the routing system 103 may confirm that an agent record for each agent of the agent pool exists. An example user interface corresponding to steps 904 and 905 is described below with reference to FIG. 10C. At 906, the API selects and purchases a phone number from the list of available phone numbers from the provider, registers the URL, and includes the agents in the agent pool, thereby forming the routing configuration record for the company.

Figure 10A:
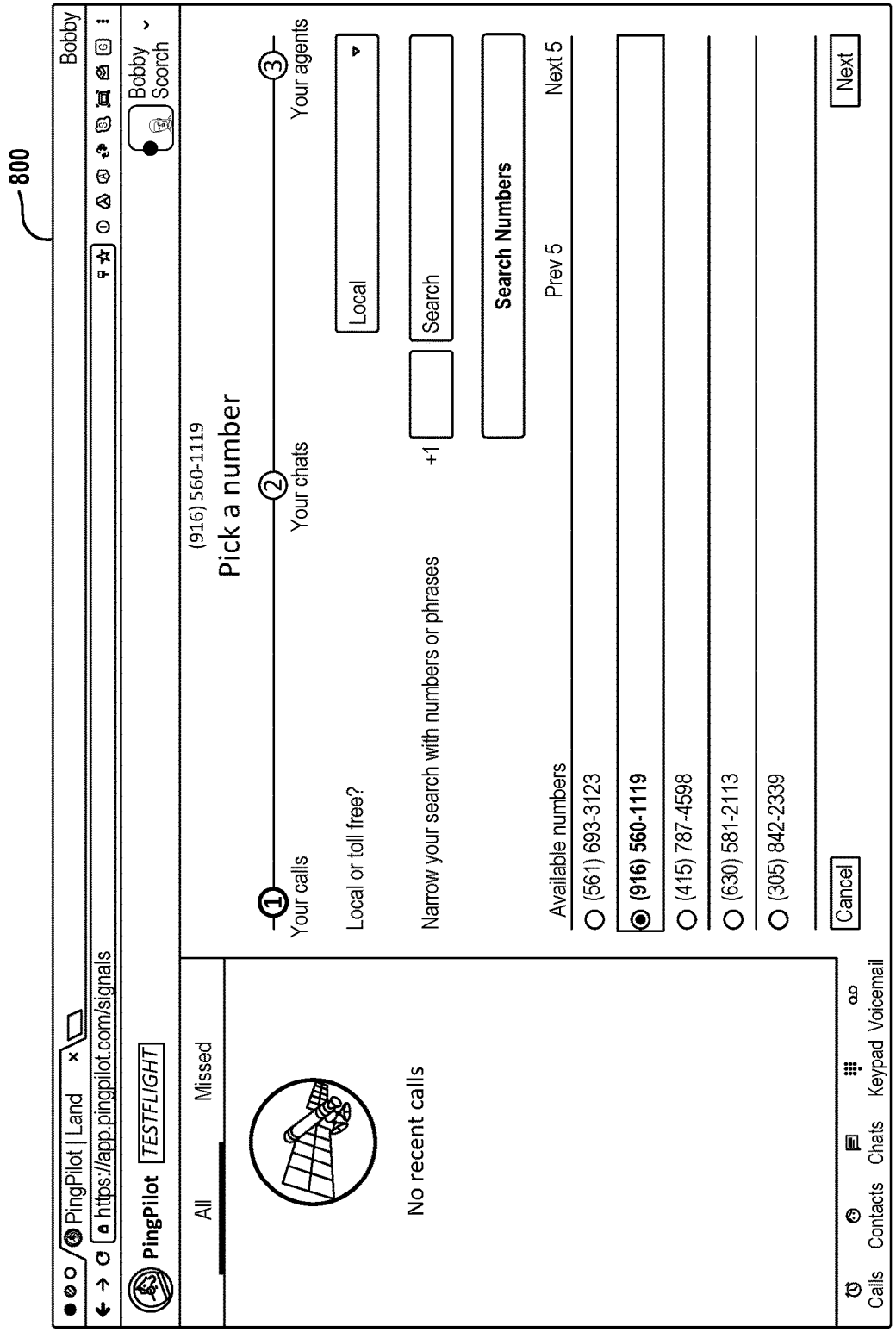
FIGS. 10A-10C are example user interfaces associated with the creation and management of a routing configuration record according to the present disclosure.

With reference to FIG. 10A, an example user interface 800 used to associate a phone number with a routing configuration record is shown. As shown in the example user interface 800, a user is prompted to select a phone number from a list of phone numbers to associate with the routing configuration record.

Figure 10B:
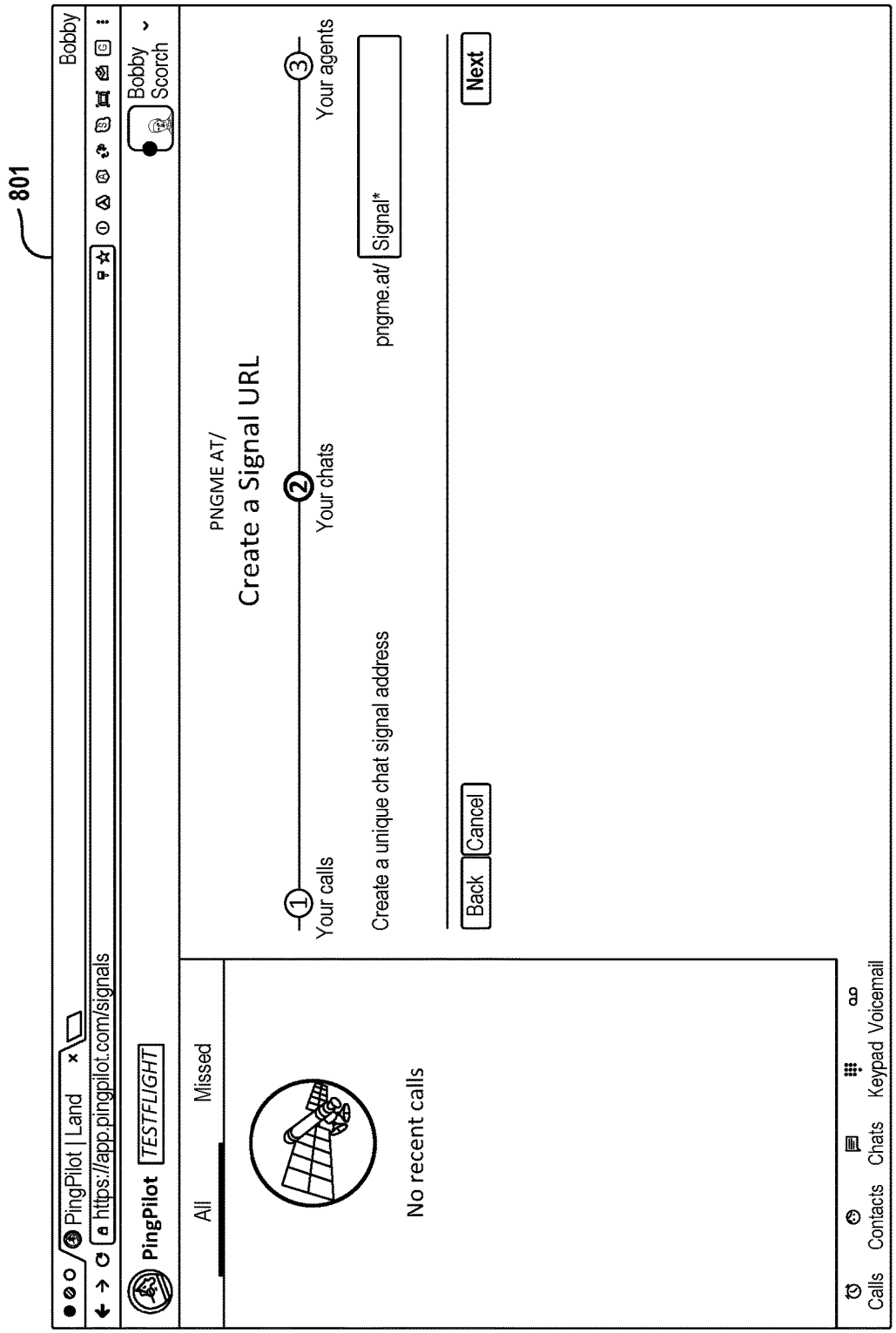

With reference to FIG. 10B, an example user interface 801 used to associate a URL with a routing configuration record is shown. As shown in the example user interface 801, a user is prompted to create a unique URL address to associate with the routing configuration record.

Figure 10C:
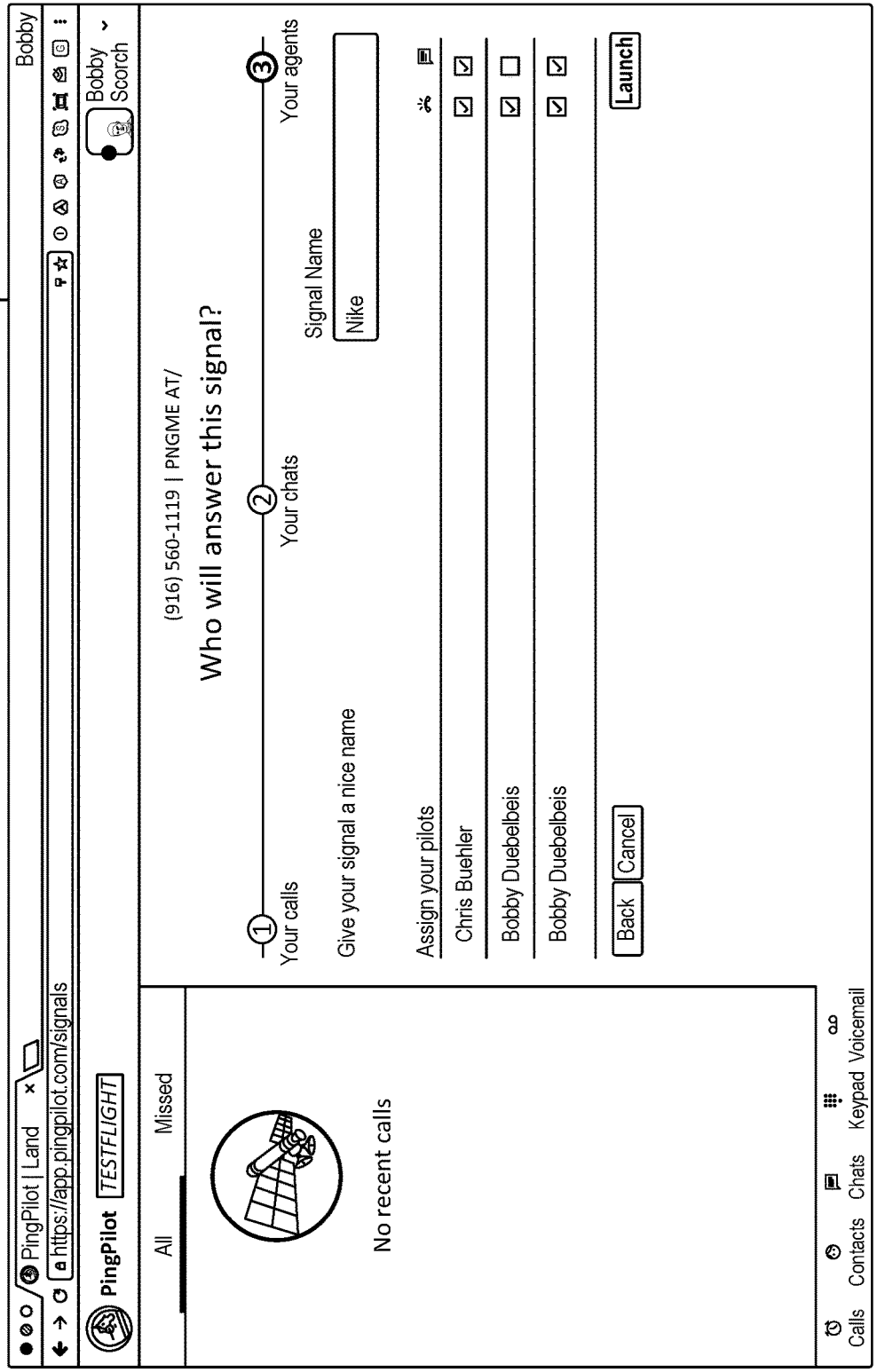

With reference to FIG. 10C, an example user interface 802 used to create a pool of agents associated with a routing configuration record is shown. As shown in the example user interface 802, a user is prompted to identify the unique chat signal address with a name and designate agents in order to create the pool of agents associated with the routing configuration record. Additionally, as shown in the example user interface 802, the user may designated communication privileges associated with each agent in the pool of agents, as indicated by the checkmarks associated with each agent. The user may designate a phone communication privilege, a SMS message communication privilege, and/or a chatroom communication privilege.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A computer-implemented method for linking a requestor to an agent of an entity, comprising:
   receiving, by a router, a request to connect to an agent of an entity from a given requestor;
   determining, by the router, whether an agent of the entity has been assigned to the given requestor;
   establishing, by the router, a communication link between the given requestor and an assigned agent in response to a determination that an agent is assigned to the given requestor; and
   selecting, by the router, an agent to assign to the given requestor in response to a determination that an agent is not assigned to the given requestor;
   wherein selecting an agent to assign to the given requestor includes:
      retrieving, by the router, a pool of agents from a data store, wherein the agents in the pool of agents are associated with the entity and wherein each agent in the pool of agents has a rating and rating is a quantity based on feedback from customers having previous interactions with the agent;
      determining, by the router, a first subset of agents from the pool of agents, where agents in the first subset of agents have the same rating and where the rating is the highest rating amongst agents in the pool of agents;
      adjusting, by the router, quantity of the ratings for each of the agents in the first subset of agents by adding a predefined fixed adjustment amount to the ratings, where predefined fixed adjustment amount is selected using one of an amount of time since an agent has interacted with a customer, a number of customers assigned to an agent, an amount and a percentage of missed calls amongst the calls routed to the agent;
      assigning, by the router, a dedicated agent to the given requestor, where the dedicated agent has highest rating amongst the agents the first subset of agents; and
      establishing, by the router, a communication link between the given requestor to the dedicated agent.

2. The method of claim 1 wherein the request to connect is in form of a phone call, a text message or an online chat.

3. The method of claim 1 wherein retrieving a pool of agents further comprises determining which agents in the pool of agents are currently available to communicate with the given requestor and removing agents that are unavailable to communicate from the pool of agents.

4. The method of claim 1 wherein adjusting ratings for each of the agents in the first subset of agents further comprises determining an amount of time since a given agent has interacted with a customer and adjusting the rating for the given agent by a quantity that is proportional to the amount of time since the given agent interacted with a customer.

5. The method of claim 1 wherein adjusting ratings for each of the agents in the first subset of agents further comprises determining a number of customers assigned to a given agent and adjusting the rating for the given agent inversely proportional to the number of customers assigned to a given agent.

6. The method of claim 1 wherein adjusting ratings for each of the agents in the first subset of agents further comprises determining a percentage of missed calls amongst the calls routed to a given agent and adjusting the rating for the given agent inversely proportional to the percentage of missed calls.

7. The method of claim 1 wherein establishing a communication link includes placing a call to the dedicated agent, sending a text message to the dedicated agent, or initiating an online chat between the given requestor and the dedicated agent.

8. The method of claim 1 further comprises prompting the given requestor for feedback regarding the dedicated agent prior to terminating the communication link between the given requestor and the dedicated agent.

9. A computer-implemented method for linking a requestor to an agent of an entity, comprising:
receiving, by a router, a request to connect to an agent of an entity from a given requestor;
determining, by the router, whether an agent of the entity has been assigned to the given requestor during a previous communication with the entity;
establishing, by the router, a communication link between the given requestor and an assigned agent in response to a determination that an agent is assigned to the given requestor; and
selecting, by the router, an agent to assign to the given requestor in response to a determination that an agent is not assigned to the given requestor;
wherein selecting an agent to assign to the given requester includes:
retrieving, by the router, a pool of agents from a data store, wherein the agents in the pool of agents are associated with the entity and wherein each agent in the pool of agents has a rating and rating is a quantity based on feedback from customers having previous interactions with the agent; removing agents from the pool of agents, where the removed agents were previously banned by the customer;
determining, by the router, a first subset of agents from the pool of agents, where agents in the first subset of agents have the same rating and where the rating is the highest rating amongst agents in the pool of agents;
adjusting, by the router, quantity of the ratings for each of the agents in the first subset of agents, where ratings are adjusted by adding a predefined fixed adjustment amount to the ratings, where predefined fixed adjustment amount is based on an amount of time since an agent has interacted with a customer, a number of customers assigned to an agent, and a percentage of missed calls amongst the calls routed to the agent;
assigning, by the router, a dedicated agent to the given requestor, where the dedicated agent has highest rating amongst the agents the first subset of agents; and
establishing, by the router, a communication link between the given requester to the dedicated agent.

* * * * *